July 19, 1938. R. H. FOLSOM 2,124,107
AIR CONDITIONING SYSTEM WITH REGENERATIVE LOCALIZED COOLING
Filed June 30, 1933

Robert H. Folsom
Inventor.

UNITED STATES PATENT OFFICE 2,124,107

AIR CONDITIONING SYSTEM WITH REGENERATIVE LOCALIZED COOLING

Robert H. Folsom, Glendale, Calif., assignor to Young Radiator Company, Racine, Wis., a corporation of Wisconsin Application June 30, 1933, Serial No. 678,441

2 Claims. (Cl. 62—129)

The present invention relates to air conditioning and more particularly to an air conditioning method, which while applicable to any and every interior to be cooled and dehumidified for human comfort is more particularly adapted to interiors such as auditoria, work-rooms, class-rooms and the like, as well as kitchens, restaurants, and the like where for many reasons a large part of the refrigerating load is usually expanded in the supply of sufficient quantities of new air.

Now an occupied interior has three refrigeration loads;—sensible heat generated within, sensible heat leaking in through the walls, and/or dehumidification of new air. The following is very often a decidedly high percentage of the latter, and by the method about to be described hereinafter is frequently the entire and only load required to be carried.

Broadly speaking, it is an object of this invention that, in any interior requiring the supply and exhaust of air, the wet bulb temperature or total heat of the exhaust air shall be as close to or even, if possible, higher than the wet-bulb of the entering air, notwithstanding the fact that the wet bulb of the interior will usually be well below the wet-bulb temperature of the exhaust.

I am aware that the latent cooling effect contained in exhaust air has been utilized in varying degrees but usually in some indirect or complicated manner, whereas it is the object of this invention to provide for utilizing the latent refrigerating effect of exhaust air to produce local and controlled removal of sensible heat from the interior.

Another object of the invention is the provision of a complete air-conditioning system in which expensive recirculation ducts, recirculation fans, by-pass controls, reheater complications and the like are all dispensed with to result in a comparatively simple system.

It is recognized that for economy in first costs and operating costs in large buildings and the like that a central fan and dehumidifier is to be desired. The objection however, is that local and zone control over temperatures is then rendered more difficult, and in air cooling as in air heating systems, present methods are becoming even more complex by the introduction of the so-called split system in which refrigerated water is sent to localized air coolers while the dehumidifying and some cooling effect is produced by the central plant.

It is a particular object of this invention to provide a central plant in which dehumidification is accomplished but in which recirculation is not necessarily required; recirculation for proper air motion and comfort being localized at the point where needed.

Of course, independently of the advantages of the complete system about to be described it is an object of this invention to put to use the latent refrigerating effect of air being exhausted, in a simple manner and by a simple dependable device.

In the drawing accompanying this specification

Figure 1:
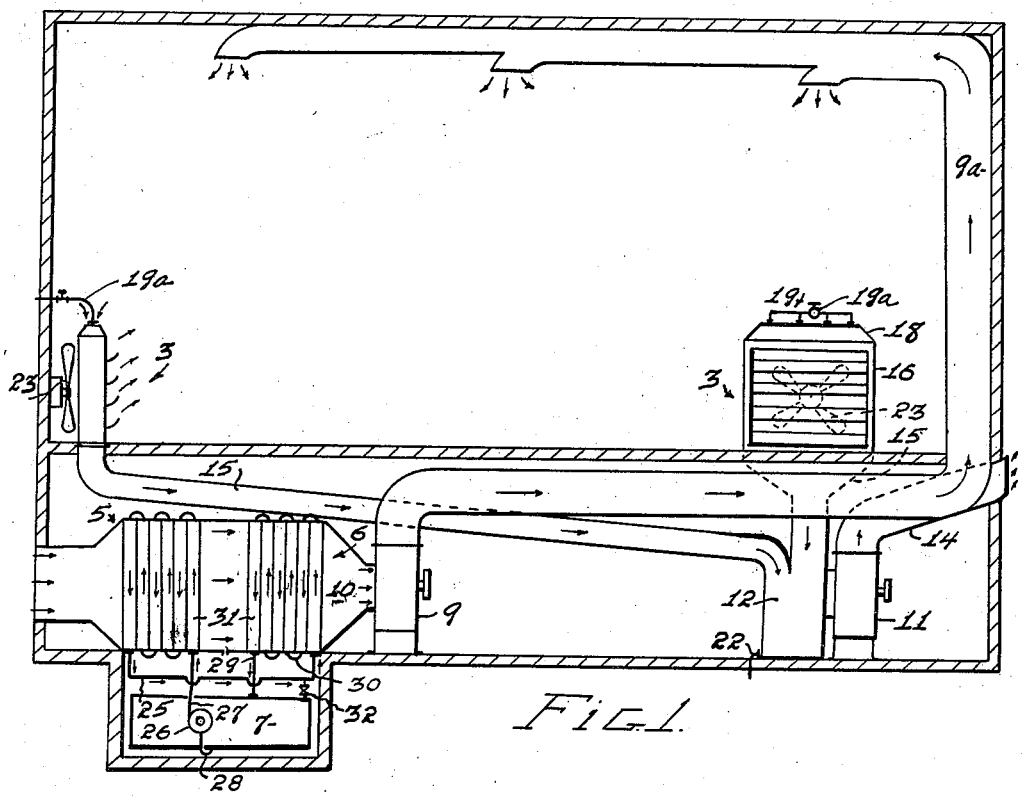
Figure 1 is a diagram showing the arrangement of fans, ducts, heat transfer units, etc., forming one practical embodiment of the invention.
Figures 2, 3:
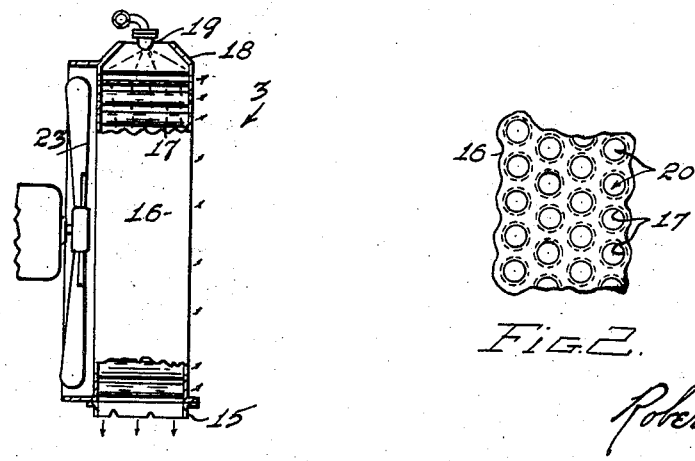
Figure 2 is a view partly in end elevation and partly in vertical section of a part of the plant hereinafter known as the regenerated or individual air cooler.
Figure 3 is a fragmentary face view thereof.

In carrying out the present invention in the embodiment illustrated and in a complete air conditioning system, I propose first the use of a compact central dehumidifier which handles only the new air quota and which dehumidified same to a certain degree or dew-point below that required to be maintained. Inasmuch as the passage of this air through ducts and the like, to the spaces to be kept comfortable, results in certain gains of sensible heat and certain corresponding losses of expensive refrigerating effect, I propose, by the method set forth in my co-pending application Serial No. 678,442, now Patent No. 2,018,780, issued Oct. 29, 1935, to reheat this dehumidified air, back to about interior temperature so that it is readily transported to the interior without gain or loss of heat. In so reheating this air back the sensible heat added to it is taken from some refrigerating conserving media such as the initial cooling water, so that the total refrigerating cost for dehumidifying the air is the cost only represented by the extraction of the latent heat.

No matter how long or inefficient the ducts leading to the interior points, no loss of refrigerating effect will result.

This dry air is led into the interior and, by reason of being at interior temperature and at slightly lower dew point it mixes very readily with the interior air and although slightly heavier its descent upon the occupants is unnoticed. In fact, with air having a dew point a few degrees lower than the dew point of the air with which it is to be mixed, the admixture of this dryer air with the interior air takes place in an ideal manner and does not present the stratification difficulties now so commonly encountered.

Now we find the interior at comfort temperature, proper dew point, etc. and yet the cost of supplying this air in terms of refrigeration is only the latent heat represented by the difference between interior wet bulb temperature and wet bulb temperature of the atmosphere. I propose to so predetermine the dew point of the interior that this difference is equal to the maximum sensible heat load of the interior so that in raising the exhaust air to outdoor wet-bulb I extract from the interior all the sensible heat generated, thereby cooling and ventilating the interior at a total cost of refrigeration amounting only to the total sensible heat load, or, to be more correct perhaps, the total heat load representing all heat developed in the interior, so that the net saving of this method over the older common methods is the saving of the usual loss shown by the discharge of interior air at wet bulbs lower than outdoor wet bulbs, and also the saving of power usually required in lengthy recirculation systems.

Aside from the conception of the general system a salient feature of the invention resides in the exhaust regenerator. This is described more particularly hereinafter and is preferably located directly in the interior. Like any unit cooler, there may be a great plurality, or a central one or any combination but inasmuch as each unit moves a relatively large amount of recirculated air in a localized area like any small fan or unit, it is proposed to distribute a great plurality of them about so that even each individual in the interior may regulate the combination of surrounding dry bulb temperature and air motion to his particular fancy.

The general method of operation or heat transfer method found in the regenerator is as follows:—Air in the interior is caused to move over prime heat transfer surface while kept out of contact with the air being exhausted. The air being exhausted is in contact with the opposite surface and as this exhaust air passes along such surface it is continually brought into contact with water to keep it as close to its wet bulb temperature as is possible at all times. Thereby it appears that when the exhaust air first enters the regenerator and strikes the wet surfaces the surfaces are reduced to the wet bulb temperature of the interior, while the dry air of the interior is cooled by contact with the opposite dry surface. In this way the air passing through the regenerator is gradually heated up and further increases its dew point, meanwhile taking heat from the interior. Finally this air leaves at high dew point or high wet bulb, having delivered back to the interior all of the refrigerating effect first expended upon it by the dehumidifier. From the foregoing it will be apparent that if the air is exhausted from the building at high wet bulb temperature the cost in terms of refrigerating effect for new air is nil and the total cost of cooling the interior and keeping the humidity at proper level is only the internal heat load due to internal heat generation and heat leakage through walls.

By keeping a reasonably low dew-point, the comfort zone can be reached even with a relatively high interior dry-bulb temperature. The higher the interior dry bulb the higher the wet-bulb to which it is possible to raise the exhaust air. When the exhaust air is raised to a wet bulb temperature higher than the wet-bulb of the atmosphere, then some of the total heat load is handled without the aid of refrigeration. For example; in the case of an atmospheric wet bulb of 70°, an interior dew point of 53°, a total internal heat load of 100 ice-tons, and an exhaust temperature of 78 wet bulb, only 68 percent of the load is required in terms of actual refrigeration, in which case a 68 ice-ton refrigerating plant will carry the load whereas by old methods the total, where appreciable ventilation is required, would be more than double this amount.

The reference numeral 5 indicates a dehumidifier and the numeral 6 a reheater. These may be of any of the many types now in use but are here shown as each being of the counter-current interchange type, arranged so that cold water from a water cooler 7 is circulated first through the dehumidifier and then through the reheater. The amount of water circulated is limited to less than three pounds per four pounds of air being dehumidified so that the water leaving the dehumidifier is heated by the incoming air to a temperature slightly above that to which it is desired to reheat the air which leaves the dehumidifier. This water, in then passing through the reheater, reheats the air to desired interior temperature and the water is thereby partially recooled. A supply fan 9 draws from the chamber 10 in which the dehumidifier and reheater are disposed and discharges to a supply duct leading to the interior. Only the required new air for the interior is so handled.

Exhaust air is handled by the usual exhaust fan 11 which draws air from the interior through the exhaust duct 12 and discharges it to the exterior as at 14.

At each inlet branch 15, for the exhaust duct, there is located the regenerator 3, so arranged that air is drawn from the room through this regenerator. A regenerator comprises a casing 16, a great multiplicity of tubes 17, an inlet hood 18 to the casing, and a spray nozzle 19. The latter is (though not shown) connected with any suitable source of water supply and the temperature of the water is practically immaterial as the amount used is only slightly more than that required to raise the dew-point of the exhaust air to a degree slightly below the dry-bulb of the interior. The front and rear walls of the casing are perforated as at 20 so that the open area there is a high percentage of the total area. The tubes are passed through aligned openings. Thus the casing forms an air duct through which air drawn by the exhaust duct passes over the outside surfaces of the tubes.

It is to be noted particularly that by reason of the interior air being first supplied through a dehumidifier, it is practically free from dust particles, acid gases, and the like, and has no clogging or corrosive effect upon the tubes of the regenerator, as would be the case otherwise. The spray nozzle is located in the hood immediately adjacent the air inlet and is arranged to keep the mass of tubes wetted at all times during operation. The tubes are of such nature that when water is applied to their outer surfaces this water will form thin films thereon and remain until evaporated.

The casing of each regenerator connects directly with the interior of the exhaust duct so that surplus water will enter the duct and gravitate to the drain opening 22. For each regenerator a fan 23 is provided to blow air through the tubes from the rear and out through the front.

In operating the complete plant both central fans are operated as in any central fan system.

When only these fans are operated, the dehumidifier-reheater portion of the complete plant, and the supply and exhaust fans, merely act to ventilate the interior and to keep the dew point thereof, at proper level. To operate a regenerator the spray nozzle is operated to keep the outer surfaces of the tubes wetted, and the individual fan is operated to move air through the inside of the tubes. At the top of the regenerator, where the air first enters, the outer surfaces of the tubes will tend to attain wet bulb temperature of the interior and the dry indoor air passing through the upper tubes is cooled appreciably; thereby heating the air passing over the outer surfaces of the tubes. As the air tends to heat it is capable of, and does, take on more moisture. As the exhaust air travels down through the casing of the regenerator and encounters the successive rows of tubes it becomes further heated and humidified and finally leaves and enters the exhaust duct at a wet-bulb temperature fairly close to the dry bulb of the interior. It will be understood that the spray nozzle is to supply enough water to keep all tubes wetted and there must be a slight excess to insure proper humidification of the air. The recirculated room air leaving the upper tubes will of course be cooler than that leaving the lower tubes but none of it need be low enough to be unpleasant or objectionable.

It will be seen that all of the air entering the room by reason of fan 9 must either pass out through the windows and doors or through outlet 14, and that all of the air forced out of the room by fan 11 must come into the room through units 5 and 6. In modern air conditioned rooms, the windows and doors are kept shut; in fact the rooms are practically air tight; therefore fans 9 and 11 cooperate and act on all of the air being moved. Clearly since the fans 9 and 11 have the same capacity, there will be no tendency for air leaks from or into the room because of intermittent opening of doors or windows; in fact a permanently open window or door would not materially unbalance the operation of the system as the balance would be maintained by the two fans, a novel feature being that the room air is recirculated and cooled and the admitted air is first mixed with the room air before being recirculated, insuring comfort to the occupants in all parts of the room; particularly so when two or more cooling units are suitably positioned in the room.

It is apparent now that I have provided, a ventilating plant which supplies dehumidified air and which in so doing supplies only latent, and no sensible, refrigerating effect to the interior. Then at points in the interior this air is exhausted through the regenerators, which on demand, or continuously, produce the required cooling effect, by converting the latent cooling effect of the dry air into sensible cooling effect.

The invention is not limited to the specific plant or method of operation shown, the scope of the invention including all modified constructions, arrangements and methods for operation and being defined in the appended claims.

I claim:

1. A device of the class described comprising a normally closed room in combination with a system for conditioning the air therein, said system comprising a dehumidifying and reheating unit having an outside air inlet, a fan and an air outlet duct communicating with said room, and a recirculating and exhaust unit comprising a heat exchange core having a room air inlet and outlet and a fan adapted to recirculate a relatively large volume of room air therethrough and means whereby a relatively small volume of room air and being equal to the volume of air discharged into the room by said dehumidifying and reheating device is moved from said room through said core in heat exchange contact with the recirculated air and then is discharged from said room, means for wetting the discharged air while passing through said core to thereby cool the recirculated air by evaporation.

2. A device of the class described, including in combination a normally closed room and a system for conditioning the air therein, said system comprising a dehumidifying and reheating unit having an outside air inlet, a blower fan and an air outlet duct leading into said room, and one or more recirculating and exhaust units comprising means for producing a sensible cooling effect as required in said room by passing a relatively large volume of recirculated room air in heat transfer relationship with a relatively small volume of room air, the small volume being equal to the admitted air from said dehumidifying and reheating unit, wetting said portion of air as it draws heat from the recirculated air and finally exhausting said wetted air by means of a blower fan, said first fan being substantially equal in capacity to said second fan, said means for producing sensible cooling effect and said means for dehumidifying and reheating the outside air being separate units and providing air inlet and outlet connections for said room.

ROBERT H. FOLSOM.